Patented Dec. 13, 1949

2,491,409

UNITED STATES PATENT OFFICE 2,491,409

COPOLYMER OF UNSATURATED FUMARATE ALKYD RESIN

Edward L. Kropa, Old Greenwich, and Arthur S. Nyquist, Cos Cob, Conn., assignors to American Cyanamid Company, New York, N. Y., a corporation of Maine No Drawing. Application November 2, 1946, Serial No. 707,532

17 Claims. (Cl. 260—45.4)

This invention relates to the production of new materials having valuable and characteristic properties that make them especially suitable for use in industry, for example, in molding, casting, coating, laminating, adhesive and electrically insulating applications, and for other purposes. More particularly the invention is concerned with polymerizable compositions comprising a modified unsaturated alkyd resin or complex ester obtained by an esterification reaction of ingredients comprising a polyhydric alcohol (e. g., a dihydric alcohol, a trihydric alcohol, etc.) and a polycarboxylic acid including fumaric acid while admixed with an adduct formed by reaction of a terpene body comprising essentially an acyclic terpene, in which at least two of the double-bonded carbon atoms are conjugated, e. g., ocimene, alloöcimene, myrcene, etc., with ingredients comprising a member of the class consisting of (1) fumaric acid, (2) partial esters of fumaric acid and a polyhydric alcohol and (3) mixtures of (1) and (2), the adduct being formed while the adduct-forming reactants are admixed with an alcohol, more particularly a polyhydric alcohol; also polymerizable compositions comprising such a modified unsaturated alkyd resin and a different compound which is copolymerizable therewith and which contains a $CH_2=C<$ grouping, for example, styrene, diallyl phthalate, etc.; and the products obtained by polymerizing such polymerizable compositions or mixtures. The scope of the invention also includes methods for the preparation of such polymerizable and polymerized compositions. The invention is concerned specifically with compositions of the kind described above wherein the acyclic terpene used in forming the adduct is alloöcimene and the comonomer containing a $CH_2=C<$ grouping is an aromatic hydrocarbon which contains a $CH_2=C<$ grouping attached directly to a benzene nucleus, e. g., styrene.

One of the objects of this invention is to prepare new and useful resinous materials characterized by their good electrical properties, particularly a low power factor and a relatively low dielectric constant, combined with good heat-resistant characteristics.

Another object of the invention is to prepare a polymerizable, modified unsaturated alkyd resin having improved compatibility with styrene and other monomeric materials.

Another object of the invention is to provide potentially polymerizable casting, molding and other compositions which have good storage stability and which can be handled without difficulty prior to and during fabrication.

Still another object of the invention is to control the rate of polymerization of the mixture of copolymerizable materials as well as to improve the properties of the resulting gels.

A further object of the invention is to provide new synthetic materials which are suitable for use not only as electrically insulating compositions or as components of such compositions, but also as coating, casting, molding, laminating and adhesive compositions and as ingredients of such and other compositions.

Another object of the invention is to provide methods for the preparation of the new materials with which the invention is concerned.

Other objects of the invention will be apparent to those skilled in the art from the description which follows.

Prior to our invention considerable difficulty was encountered in producing electrically insulating materials of optimum electrical properties by copolymerization of styrene and similar monomers with conventional unsaturated alkyd resins having good physical and electrical properties due, for one reason, to the unsatisfactory compatibility characteristics of the mixed materials. This difficulty was enhanced when the polycarboxylic acid component of the alkyd resin was wholly or mainly fumaric acid, but was less marked or absent when the polycarboxylic acid or anhydride was wholly or mainly maleic acid or anhydride. Difficulty also was encountered when effort was made to improve the electrical properties of the copolymer by trying to modify the unsaturated alkyd resin with a modifier of high molecular weight without decreasing the compatibility of the alkyd resin with styrene or other monomer. We have found that these difficulties can be obviated or minimized, and products having improved electrical properties combined with good heat-resistance and other improved physical characteristics can be obtained, by preparing the unsaturated alkyd resin in the presence of an adduct formed by reaction of alloöcimene or other acyclic terpene of the kind heretofore described with ingredients comprising fumaric acid, or partial esters of fumaric acid and a polyhydric alcohol or mixtures of such acid and esters, the adduct being formed while the adduct-forming reactants are admixed with an alcohol, more particularly a polyhydric alcohol.

In brief, the present invention is based on our discovery that polymeric or copolymeric materials produced by polymerizing compositions such as described in the first paragraph of this specification have improved and unobvious properties which render such materials especially valuable in industry, more particularly in electrically insulating applications, and specifically in radar applications. For example, polymerized compositions such as heretofore produced, for instance those made from mixtures of (1) styrene and (2) other modified unsaturated alkyd resins, e. g., a diethylene glycol fumarate sebacate resin, have substantially higher dielectric constant and power factor values than the polymerized compositions of the present invention. Thus, a copolymer of 2 parts by weight of a diethylene glycol fumarate sebacate resin and 1 part by weight of styrene had a dielectric constant of 3.03 and a power factor of 0.042 when tested at 3000 megacycles and 25° C. A similar copolymer containing, in place of the diethylene glycol fumarate sebacate resin, a resin produced, for example, by reaction of 2 mols ethylene glycol, 1 mol fumaric acid and 1 mol of an adduct formed by reaction of approximately equal molar proportions of alloöcimene and fumaric acid while admixed with ethylene glycol, had a dielectric constant of 2.82 and a power factor of 0.017 when tested in the same manner. These improved electrically insulating characteristics are due mainly to the introduction of the adduct into the unsaturated alkyd resin.

In practicing our invention substantially insoluble, substantially infusible resins are obtained by means of the chemical reaction or polymerization of polymerizable compositions such as described in the first paragraph of this specification. The alkyd resin possesses a plurality of polymerizably reactive alpha,beta enal groups (i. e.,

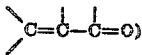

as well as unsaturated groupings in the acyclic terpene component of the adduct. At least two of the double-bonded carbon atoms of the terpene component used in preparing the adduct are conjugated, and generally the terpene component is one having in its molecule three double-bonded carbon atoms each separated from the other by a single-bonded carbon atom. The adduct is characterized by the absence of "endo" linkages therein. The other component of the polymerizable composition is one which is different from the soluble, fusible, reactive, adduct-modified alkyd resin, which is copolymerizable with such alkyd resin and which contains the polymerizably reactive grouping $CH_2=C<$. We prefer to use as the $CH_2=C<$-containing compound one which has a boiling point of at least 60° C. and which has no conjugated carbon-to-carbon bond or bonds.

The monomeric materials containing a $CH_2=C<$ grouping, more particularly one or more vinyl or allyl groupings, which are copolymerized with the resin component of the polymerizable mixture are reactive materials and are thus frequently referred to herein. The resins are herein distinguished from the other copolymerizable monomer or partial polymer by designating the former as "reactive resins" or as "unsaturated alkyd resins." The term "unsaturated alkyd resin" as used herein and in the appended claims does not include within its meaning the conventional drying oil-modified alkyd resins in the preparation of which an aromatic or saturated aliphatic polycarboxylic acid or anhydride is the sole polycarboxylic acid or anhydride employed. Upon adding a polymerization catalyst to the polymerizable mixture and subjecting the same to polymerization conditions such as, for example, heat, light or a combination of both, a substantially insoluble, substantially infusible resin is obtained.

Some of the reactive materials used in practicing our invention are solvents and therefore the reactive resins may be dissolved therein to form liquid compositions which may be used as such without the addition of any other solvent unless particularly desirable. It is to be understood, however, that we are not restricted to liquid substances which actually act as solvents, since in some cases the organic liquid substance may in fact act as a solute rather than as a solvent, it being dissolved by the resin, or a colloidal dispersion may be produced instead of a true solution.

When the acyclic terpene-modified resin is admixed with a reactive material containing a $CH_2=C<$ grouping, the latter may or may not dissolve the former depending, for example, upon the chemical composition of each and the proportions employed. If the resin is substantially incompatible with the reactive material, chemical interaction or copolymerization ordinarily does not occur. In such cases another solvent may then be introduced into the mixture as an additional constituent. If the solvent is inert, of course, it does not participate in the reaction. Such a solvent is so selected that both the resin and reactive material are soluble, whereby there is obtained a homogeneous system of resin, reactive material and inert solvent. The polymerization products or copolymers of this invention are produced from compatible combinations of the reactive resin and a different reactive material containing a $CH_2=C<$ grouping. Such combinations may be obtained by the use of inert blending solvents when necessary, although the use of only reactive materials containing a $CH_2=C<$ grouping that act as solvents is preferred.

When the reactive resin and the reactive material containing a vinyl, allyl or other $CH_2=C<$ grouping undergo chemical reaction, certain possibilities arise. The reactive resin and the reactive material may combine in such a manner as to lead to the formation of a resinous colloidal entity, yielding an end-product which is clear, glass-like and homogeneous. Alternatively, the reactive resin and the reactive material may interact in such a manner as to yield colloidal entities wherein varying degrees of opacity or colloidal colors result.

The terms "compatible" and "homogeneous" as used herein are intended to include within their meanings a system, the constituents of which are uniformly distributed throughout the whole mass, and when applied to solutions to indicate that they may be either true solutions or colloidal solutions so long as they are substantially stable.

In forming the adduct it is important that it be produced while admixed with an alcohol, more particularly a polyhydric alcohol, and preferably one corresponding to the alcohol used in effecting the main resin-forming esterification reaction. The alcohol serves several purposes including a better control of the reaction and a solubilizing effect upon the adduct and the final alkyd resin in which the adduct is embodied. The acyclic terpene is added slowly to the heated mixture of ingredients comprising fumaric acid and a polyhydric alcohol, or to a partial ester of fumaric acid and a polyhydric alcohol, or to a mixture of such acid and ester. If the adduct is to be formed of a partial ester of a polyhydric alcohol and fumaric acid, such ester is produced by technique well known to those skilled in the art, for example, by heating the mixed ingredients to a temperature of the order of 120° to 230° C. under an atmosphere of nitrogen, carbon dioxide or other inert gas and in the presence or absence of an esterification catalyst until a partial ester has been obtained. The mixture of fumaric acid and polyhydric alcohol may be heated under less drastic conditions of time and temperature, for example, merely sufficiently to obtain a homogeneous mixture or solution of the ingredients if little or no partial ester formation is wanted and the adduct formation is to be primarily between the acyclic terpene and the fumaric acid. If the polyhydric alcohol is branched as in, for example, propylene glycol, dipropylene glycol, etc., a partial ester (or mixture thereof with fumaric acid and polyhydric alcohol) is usually formed first, after which the acyclic terpene adduct thereof is made.

After the acyclic terpene has been added to the reaction mass, heating is continued for a suitable period at a suitable temperature in order to complete the formation of the adduct. When the acyclic terpene is, for example, alloöcimene, heating under reflux and an inert atmosphere for a period of the order of 10 to 90 minutes at a temperature of about 120° to 160° C. is usually satisfactory.

The amount of polyhydric alcohol employed in forming the adduct may be varied considerably but usually the polyhydric alcohol is used in the ratio of at least 2 mols thereof, e. g., from 2 to 6 mols thereof, for each mol of fumaric acid employed in the preparation of the adduct. In some cases the adduct may be formed using approximately equal molar proportions of polyhydric alcohol and polycarboxylic acid including fumaric acid. For example, the acyclic terpene may be added to a partial ester of equal molar proportions of polyhydric alcohol and fumaric acid, some unreacted polyhydric alcohol also being associated with such ester. The molar amount of acyclic terpene should be approximately equal to the molar amount of fumaric acid used in making the adduct. When the acyclic terpene is alloöcimene, optimum results have been obtained when the total polyhydric alcohol (e. g., a glycol) and fumaric acid reactants used in making the complex ester are in approximately equimolecular proportions or with the alcohol slightly in excess of the acid, and the molar proportions of each range from about 2 to 3 mols thereof for each mol of alloöcimene employed.

After forming the adduct, which is dissolved or dispersed in the polyhydric alcohol, any additional polyhydric alcohol or polycarboxylic acid including fumaric acid, or both, with or without other monohydric alcohol or mono- or polycarboxylic acid or anhydride modifiers or other modifying reactants is added to the dissolved adduct and an esterification reaction is effected between the ingredients of the reaction mass. The reaction is carried out while the reaction mass is under an inert atmosphere, e. g., an atmosphere of nitrogen, carbon dioxide or other inert gas, at a suitable temperature, e. g., from about 120° to 230° C. until a complex ester of the desired acid number has been obtained, e. g., an acid number of from about 35 to 130. In some cases an esterification catalyst, e. g., p-toluene sulfonic acid, may be employed to accelerate the reaction. During the esterification the evolved water is removed continuously from the reaction mass. The resulting thermoplastic, polymerizable unsaturated alkyd resin or complex ester, when cool, is usually a hard, brittle resin, depending upon the particular reactants and molar ratios thereof which have been employed, and other influencing factors. It has improved compatibility with styrene and other monomeric materials as compared with other fumaric acid types of unsaturated alkyd resins internally modified with a high molecular weight modifier.

In making the adduct and resin, we prefer to use a glycol as the polyhydric alcohol. If light-colored resins be sought, it is preferable to use glycols which do not have any oxygen bridges in their structure since the presence of oxygen linkages may lead to the formation of color bodies during the preparation of the resin. On the other hand, glycols containing oxygen bridges may be desirable in some cases, for example when the polymerizable composition is to be used in coating applications. The reactive resin may be prepared using polyhydric alcohols other than the glycols or using mixtures including a glycol and a higher polyhydric alcohol, examples of which are glycerol, pentaerythritol, etc. Polyhydric alcohols containing more than two hydroxyl groups react very readily with fumaric acid. Consequently, it may be preferable to use some monohydric alcohol in conjunction with the alcohols which contain more than two hydroxyl groups or else some monobasic acid may be used. The particular choice of glycol or other polyhydric alcohol used in practicing our invention is governed mainly by the physical properties desired in the intermediate and final polymerization products, especially hardness, impact resistance, distensibility, refractive index, adhesion, compatibility relationships, etc., including also solvent, water, alkali, acid or chemical resistance in general.

The adduct of the fumaric acid or of the fumaric acid-polyhydric alcohol partial ester with the acyclic terpene may be formed while the ingredients are admixed with other ingredients in addition to a polyhydric alcohol, e. g., in the presence of maleic acid or anhydride, in which case an admixed adduct may be obtained, or in the presence of other ingredients used in the preparation of the unsaturated alkyd resins such as are described briefly hereafter and more fully in various copending applications of one of us (Edward L. Kropa), for instance in copending applications Serial No. 540,142, filed June 13, 1944, now Patent No. 2,443,740; Serial No. 555,194, filed September 21, 1944, now Patent No. 2,443,741; Serial No. 616,648, filed September 15, 1945, and Serial No. 653,959, filed March 12, 1946, now Patent No. 2,485,294. Or, if the adduct formation of the acyclic terpene is not effected in the presence of such modifying ingredients, the latter may be added to the reaction mass after the adduct has been formed and esterification then may be carried out in the presence of both the adduct and any other added modifiers.

Illustrative examples of acyclic terpenes in which at least two of the double-bonded carbon atoms are conjugated that may be used in forming the adduct are ocimene, alloöcimene, myrcene, β-myrcene, cryptotaenene, etc. The acyclic terpene may be used in a substantially pure state or in an admixture with other terpenes. The admixture, however, should contain substantial quantities of the acyclic terpene, and preferably the acyclic terpene constitutes a major proportion of the admixture, for example from a little more than 50% to 95% or more by weight of the admixture. Other terpene bodies, e. g., alpha-pinene, dipentene, etc., may be other components of the admixture, but these usually do not react under the conditions employed and can be removed from the reaction mass, e. g., by distillation, after the adduct has been formed, e. g., during the esterification or condensation reaction.

In some cases it may be desirable to use an acyclic terpene body which has been treated to free it of peroxides. This may be done, for instance, by treating the acyclic terpene with a suitable reducing agent, steam-distilling the treated material, and collecting the distillate under an atmosphere of an inert gas. Thus, 400 parts by weight of, for example, alloöcimene, may be added to 500 parts of an aqueous solution containing 50 parts $FeSO_4 \cdot 7H_2O$ and 10 parts of dilute sulfuric acid. The mixture is heated on a steam bath for 1 hour with frequent shaking. The alloöcimene is then steam-distilled from the same vessel containing the treated material, and the distillate is collected under an atmosphere of carbon dioxide. The resulting alloöcimene is peroxide-free.

If desired, the resin may be made under azeotropic conditions. In such a case the esterification reaction is conducted in an organic solvent which dissolves the reactants as well as the resulting resin and which is substantially insoluble in water. Examples of these are: benzene, toluene, xylene, chloroform, carbon tetrachloride, ethylene dichloride, propylene dichloride, ethylene and propylene trichlorides, butylene dichloride and trichloride, and also higher boiling solvents such as cresol and methyl cyclohexanone, although some of these may tend to darken the resin. The mixture is refluxed in such a manner as to separate the water formed by the esterification. Lower temperatures generally are used than when the esterification is effected under non-azeotropic conditions, for example between 90° and 145° C. for the lower boiling members of the group of solvents set forth above. Obviously, this will vary with different solvents and with different concentrations of solvent. The range of preferred concentrations for the inert solvent is from about 25% to about 50% by weight of the mixture.

Illustrative examples of monomeric materials that may be copolymerized with the adduct-modified unsaturated alkyd resin, in the presence or absence of a polymerization catalyst, are reactive compounds which contain a $CH_2=C$ grouping, more particularly a $CH_2=CH-CH_2-$ grouping, especially those which have a boiling point of at least about 60° C. Of the monomeric materials which may be used the allyl esters form a large class, all of which are suitable. The reactive allyl compounds which have been found to be most suitable are those having a high boiling point such as the diallyl esters, e. g., diallyl maleate, diallyl fumarate, diallyl phthalate and diallyl succinate. Other allyl compounds which are not necessarily high boiling also may be used.

More specific examples of allyl compounds that may be employed in making the new synthetic materials or copolymers of the present invention are: allyl alcohol, methallyl alcohol, allyl acetate, allyl lactate, the allyl ester of apha-hydroxyisobutyric acid, allyl trichlorosilane, allyl acrylate, allyl methacrylate, diallyl carbonate, diallyl malonate, diallyl oxalate, diallyl gluconate, diallyl propanolamine dicarbonate, diallyl methylgluconate, diallyl adipate, diallyl azelaate, diallyl sebacate, diallyl tartronate, diallyl tartrate, diallyl silicate, diallyl mesoconate, diallyl citraconate, diallyl glutaconate, the diallyl ester of muconic acid, diallyl itaconate, diallyl chlorophthalates (e. g., diallyl tetrachlorophthalate), diallyldichlorosilane, the diallyl ester of endomethylene tetrahydrophthalic anhydride, triallyl tricarballylate, triallyl aconitate, triallyl citrate, triallyl phosphate, trimethallylphosphate, tetraallyl silane, hexaallyl disiloxane, etc.

Other examples of allyl compounds that may be employed in practicing our invention are: allyl oxalate, diallyl ethylene glycol dioxalate, diallyl neopentyl glycol dioxalate, triallyl glyceryl trioxalate, diallyl ethylene glycol dicarbonate, diallyl diethylene glycol dicarbonate, diallyl trimethylene glycol dicarbonate, diallyl neopentyl glycol dicarbonate, diallyl glycerol carbonate, triallyl glycerol tricarbonate, tetraallyl pentaerythritol tetracarbonate, tetraallyl alpha,beta-dicarbo tartrate, diethyl alpha,beta-diallyl-dicarbotartrate, diallyl ester of ethylene glycol bis (alpha,beta-diallyl-dicarbo tartrate), diallyl ester of hydroxy aceto-carbonate, diallyl ester of lacto-carbonate, diallyl ester of ethylene glycol disuccinate, diallyl ester of ethylene glycol diadipate, triallyl glyceryl trisuccinate, tetraallyl pentaerythritol tetrasebacate, diallyl bis-lactocarbonate, diallyl ethanolamine dicarbonate, diallyl neopentanolamine dicarbonate, diallyl N-ethanol ethylene diamine dicarbonate, triallyl N-diethanol ethylene diamine tricarbonate, diallyl N-phenyl ethanolamine dicarbonate, triallyl ester of the tricarbonate of diethanolamine, diallyl diglycino carbonate, diallyl di-alpha-aminopropiono carbonate, diallyl di-epsilon-aminocapro carbonate, diallyl glycinamide, diallyl ester of the dicarbonate of ethylene diamine, diallyl ester of the dicarbonate of n-propylene diamine, diallyl ester of the dicarbonate of p-phenylene diamine, triallyl ester of the tricarbonate of diethylene triamine, the formaldehyde condensation product of the allyl ester of the carbonate of beta-aminopropionamide, the formaldehyde condensation product of the allyl ester of the carbonate of epsilon-amino caproic amide, the formaldehyde condensation product of the allyl ester of oxamide and the formaldehyde condensation product of the allyl ester of alpha-carboxy-amino isobutyramide. In the aforementioned copending applications of one of us (Edward L. Kropa), Serial Nos. 540,142, 555,194 and 616,648, are given general formulas for most of these compounds and brief descriptions of methods by which they may be prepared.

Other examples of monomeric materials that may be copolymerized with adduct-modified unsaturated alkyd resins such as are used in practicing the present invention are the unsaturated alcohol esters, e. g., the allyl, methallyl, crotyl, 1-chloroallyl, 2-chloroallyl, cinnamyl, vinyl, methvinyl, alpha-phenylallyl, propargyl, etc., esters of saturated and unsaturated, aliphatic and aromatic, monobasic and polybasic acids such, for instance, as acetic, propionic, butyric, valeric, caproic, acrylic, alkacrylic (e. g. methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, toluic, phenylacetic, phthalic, terephthalic, benzoylphthalic, etc.; the saturated monohydric alcohol esters, e. g., the methyl, ethyl, propyl, butyl, isobutyl, etc., esters of the unsaturated aliphatic monobasic and polybasic acids, illustrative examples of which appear above; vinyl cyclic compounds, e. g., styrene, ortho-, meta- and para-methyl styrenes, para-methoxy styrene, para-ethoxy styrene, para-cyano styrene, any of the nuclear monochloro styrenes, the 2,3-, 3-4-, 2,4-, 2,5- and 2,6-dichloro styrenes, the 2,3-, 3,4-, 2,4-, 2,5- and 2,6-dimethyl styrenes, styrenes containing one or more nuclearly substituted fluorine or bromine groups, vinyl naphthalene, the various vinyl diphenyls, vinyl carbazole, vinyl phenols, vinyl furane, vinyl cyclohexane, vinyldibenzofuran, divinyl benzene, and such unsaturated hydrocarbons as, for example, the ortho-, meta- and para-isopropenyl benzenes and toluenes, vinyl mesitylene, etc.; unsaturated ethers, e. g., ethyl vinyl ether, diallyl ether, methallyl ethyl ether, etc.; unsaturated ketones, e. g., methyl vinyl ketone, divinyl ketone, methyl allyl ketone, etc.; methylene malonic esters, e. g., methylene methyl, ethyl, propyl, butyl, etc., malonates; butadienes, e. g., 1,3-butadiene, 2-chlorobutadiene, etc. Additional examples of monomeric materials that may be employed in preparing the new copolymers of this invention are given in the various aforementioned Kropa applications, for instance in application Serial No. 616,648. The mixture of copolymerizable materials may be emulsion polymerized, if desired, by technique such as is now widely known with regard to the copolymerization of other copolymerizable monomers.

The copolymerization reaction is preferably accelerated by incorporating a polymerization catalyst into the polymerizable composition. In some cases the polymerization catalyst may be omitted as, for example, when rapidity of copolymerization is not a matter of primary importance. The polymerization catalysts include the organic superoxides, alcoholic and acidic peroxides. Among the preferred catalysts there are: the acidic peroxides, e. g., benzoyl peroxide, phthalic peroxide, succinic peroxide and benzoyl acetic peroxide; fatty oil peroxides, e. g., coconut oil acid peroxides, lauric peroxide, stearic peroxide and oleic peroxide; alcohol peroxides, e. g., tertiary-butyl hydroperoxide, usually called tertiary-butyl peroxide, ascaridole, etc. Still other polymerization catalysts may be used, if desired, e. g., soluble cobalt salts (particularly the linoleate and naphthenate), p-toluene sulfonic acid, aluminum chloride, stannic chloride and boron trifluoride.

The term "polymerization catalyst" as used in this specification is not intended to cover oxygen contained in the resin as an impurity. While this small amount of oxygen would catalyze the reaction to a very small extent, in order to eliminate any ambiguity the term "polymerization catalyst" is specifically defined as excluding any oxygen present as an impurity in the resin itself.

The concentration of catalyst employed is usually small, i. e., for the preferred catalysts, from about 1 part catalyst per thousand parts of the composition to be polymerized to about 2 parts per hundred parts of such composition. If an inhibitor be present, up to 5% or even more by weight of catalyst, based on the weight of the polymerizable composition, may be necessary according to the concentration of the inhibitor. Where fillers are used that contain high concentrations of substances which act as inhibitors, e. g., wood flour, the concentration of catalyst necessary to effect polymerization may be well above 5%.

The polymerization conditions referred to are heat, light, or a combination of both. Ultraviolet light is more effective than ordinary light. The temperature of conversion or reaction depends somewhat on the boiling point of the reactive material and also on the pressures used. At atmospheric pressure, as in coating and casting operations, temperatures near or above the boiling point are unsuitable in most instances since substantial amounts of the reactive material would be lost by evaporation before the reaction between the resin and reactive material could be completed. Accordingly, a temperature between room temperature (about 20° to 30° C.) and the boiling point is usually employed when polymerizations of this nature are carried out. The rate of polymerization doubles for about each ten degrees (C.) rise in temperature for this reaction. A temperature is selected which will give a suitable reaction rate and yet not cause substantial volatilization. Obviously it will be necessary to use lower temperatures if large or very thick pieces are being cast because of the exothermic reaction and poor heat conductivity of the reacting mixture. Where suitable precautions are taken to prevent evaporation of the reactive material or where pressure molding is used, higher temperatures than those mentioned above could be employed. In most cases the temperature of polymerization or copolymerization will be within the range of 40° to 200° C., usually within the range of 60° to 130° C., depending upon the particular polymerizable composition employed, the particular catalyst, if any, used, the rapidity of polymerization wanted, and other influencing factors.

The adduct-modified unsaturated alkyd resin, the compound which is copolymerized therewith and catalyst, if any, are selected according to the type of product wanted, taking into account the solubility or compatibility characteristics of the reactants as well as the nature of the resulting gels. In the preparation of two-, three-, four- or higher multi-component copolymer compositions, the proportions of components may be varied as desired or as conditions may require. For example, in a two-component polymerizable composition the adduct-modified alkyd resin may be as little as about 2 or 3 per cent by weight of the polymerizable mixture or as much as about 97 or 98 per cent by weight thereof. Ordinarily, however, in such a mixture the alkyd resin is employed in an amount ranging from about 20 to 80 per cent by weight of the polymerizable composition, more particularly from about 30 to 70 per cent by weight thereof, the styrene, diallyl phthalate or other monomeric or partially polymerized material or mixture of such materials constituting the remainder. Some combinations of the resin and other monomer which is copolymerizable therewith result in opaque gels, while others give clear products in the gel state. Obviously, for many purposes the opaque gel may be used equally as well as the clear gel.

The preferred polymerization products or copolymers of this invention are those obtained when, for example, a vinyl-substituted cyclic compound, more particularly a vinyl-substituted aromatic hydrocarbon, specifically styrene, is the $CH_2=C<$-containing compound which is copolymerized with the acyclic terpene-modified, specifically alloöcimene-modified, unsaturated alkyd resin. Such preferred products have, in general, a dielectric constant of less than 3.0 and a power factor of less than 0.030, usually less than 0.02, when tested at 3000 megacycles and at 25° C. Of such compositions we prefer those which are prepared from a mixture of (1) about 60 parts of the resin, especially those made from about 2 mols (or a little more) of fumaric acid, 2 mols (or a little more) of a glycol, e. g., ethylene glycol, propylene glycol, etc., and 1 mol of the acyclic terpene, specifically alloöcimene, and (2) about 40 parts of a vinyl aromatic hydrocarbon, more particularly styrene.

It may sometimes be desirable to reduce the viscosity of a liquid mixture of an adduct-modified unsaturated alkyd resin of the kind with which this invention is concerned and other reactive material copolymerizable therewith, as for instance when the mixture of ingredients in the desired proportions has a very high viscosity and it is desired to use the composition in coating applications. This reduction in viscosity may be effected by adding, for example, an esterification catalyst, e. g., p-toluene sulfonic acid, and then heating the resulting mixture until the viscosity is reduced. The mechanism of this change is probably re-esterification. It is also desirable to add a polymerization inhibitor before the heating or "thinning" process. This procedure also is useful when the polymerizable composition is to be baked at a high temperature, under which conditions some of the volatile components of the composition otherwise might be lost in part by evaporation. If this "thinning" process is carried out, the other monomeric material is combined with the unsaturated alkyd resin by re-esterification and is not lost when the composition is heated at a baking temperature.

In casting or molding or in other applications of some of the polymerizable compositions of this invention, it may sometimes be desirable to body the composition before adding the catalyst in order to reduce the induction period, which otherwise may be too long for the particular application. This may be done, for example, by heating the mixed ingredients at a suitable temperature, e. g. at from about 70° to about 110° C., preferably at about 90° C., for a period of time sufficient to reduce substantially the induction period. This time will vary depending upon such influencing factors as, for instance, the particular mixture of ingredients employed, its initial viscosity and other such factors, but may be determined by observation of the increase in viscosity. Heating should continue until the viscosity begins to increase rapidly. A general rule for determining the heating time is to heat the mixture until the viscosity is about two to three times the initial viscosity.

After the bodying operation, the polymerization catalyst is added to the mixture and the whole is subjected to polymerization conditions. The use of liquid peroxides instead of solid peroxides is an advantage after bodying the resin mixture, since it is difficult to get the solid peroxides dissolved rapidly enough. Peroxides of coconut oil acids, tertiary-butyl peroxide and ascaridole are suitable liquid peroxides that may be employed. By the use of this process the induction period is reduced from approximately ½ to ⅛ that required when the bodying process is not used with liquid polymerizable compositions. Even greater reductions are obtained in the case of some compositions. Additional details with regard to the bodying of the more reactive polymerizable compositions are given, for example, in the aforementioned Kropa copending application Serial No. 555,194.

In many cases it is desirable to produce a polymerizable composition of a particular viscosity for a particular application. This may be done, for example, by partially polymerizing styrene or similar liquid monomer, and then incorporating the partial polymer and adduct-modified alkyd resin into a monomeric material which is copolymerizable therewith, e. g., a polymerizable polyalkyl ester of an unsaturated alpha,beta-polycarboxylic acid of the aliphatic series, more particularly a polyalkyl ester of an alpha,beta-unsaturated polycarboxylic acid e. g., dimethyl fumarate, diethyl fumarate, dipropyl maleate, diethyl itaconate, etc. In this way, the viscosity of the mixture of copolymerizable materials conveniently may be increased to the point desired.

In some cases it is desirable to incorporate a polymerization inhibitor into the polymerizable composition, especially those bodied compositions above described which otherwise have a relatively short storage life, since they will frequently polymerize even at room temperature within a comparatively short time. Moreover, when it is desired to cure such compositions very rapidly under heat and pressure, the reaction at times becomes so vigorous that it cannot be controlled. In order to overcome these difficulties it has been found advisable to incorporate a small proportion of a polymerization inhibitor into the polymerizable mixture. When it is desired to use this mixture a small amount of a polymerization catalyst is added, sufficient to overcome the effect of the inhibitor as well as to promote the polymerization. By careful control of the concentrations of inhibitor and catalyst, a uniform product is obtainable with a good reaction velocity. Suitable polymerization inhibitors for this purpose are phenolic compounds, especially the polyhydric phenols, and aromatic amines. Specific examples of this group of inhibitors are hydroquinone, benzaldehyde, ascorbic acid, resorcinol, tannin, sym. di-(beta-naphthyl)-p-phenylene diamine, phenolic resins, sulfur compounds, etc.

The concentration of inhibitors is preferably low, and less than about 1% by weight of the polymerizable composition is usually sufficient. However, with the preferred inhibitors, e. g., polyhydric phenols and aromatic amines, we prefer to use only about 0.01 to about 0.1% by weight of the inhibitor, based on the weight of the polymerizable composition.

The inhibitor may be incorporated into the polymerizable composition either before or after bodying if the latter process is employed; or it may be incorporated in the alkyd resin during its preparation. By adding the inhibitor before the esterification reaction, it is sometimes possible to use an inhibitor which otherwise would be substantially insoluble in the polymerizable composition. By adding the inhibitor to the unesterified or partially esterified mixture of resin-forming reactants, the inhibitor may become bound into the resin during the esterification process.

In order that those skilled in the art better may understand how the present invention may be carried into effect, the following examples are given by way of illustration and not by way of limitation. All parts are by weight. The measurements for dielectric constant and power factor at the specified frequencies were taken at approximately 25° C.

Example 1

|  | Parts | Approx. Mol Ratios |
|---|---|---|
| Propylene glycol | 1,216 | 2 |
| Fumaric acid | 1,856 | 2 |
| Alloöcimene | 1,088 | 1 |

The above-stated amount of propylene glycol and one-half of the fumaric acid (928 parts) were first heated together in a 3-necked reaction vessel fitted with a reflux condenser, thermometer, $CO_2$ delivery tube, mechanical stirrer and dropping funnel, using an electrically heated oil bath as a source of heat. The vessel was placed in the oil bath and the heat turned on, stirring being started as soon as the fumaric acid had become sufficiently loose to do so. Carbon dioxide was introduced into the reaction vessel throughout the reaction period. The oil bath reached a temperature of 175° C. in 2½ hours, at which time the reaction mass was at a temperature of 150° C., and some esterification had taken place as evidenced by some refluxing of water.

The alloöcimene (1088 parts) was now added to the reaction mass from the dropping funnel over a period of about 1 hour, during which time the temperature of the mass fell from 150° to 133° C. The reaction was continued under reflux at 133° to 135° C. for 1 hour after all the alloöcimene had been added. During the addition of the alloöcimene there was a steady reflux of water and an immiscible liquid. There was a slight frothing in the reaction vessel, due to the presence of the water, as the adduct formed.

After standing for about 16 hours at room temperature (20° to 30° C.), the remainder (928 parts) of fumaric acid was added to the cool reaction product in the vessel, which latter was now fitted with a condenser for downward distillation in place of the reflux condenser. The vessel was heated and the contents mechanically stirred, while passing $CO_2$ through the reaction mass, for a total of 19 hours during which period the mass was heated at a temperature within the range of about 150° to 180° C. The temperature was at about 150° to 165° C. for about 7 hours, at 165° to 175° C. for about 3 hours, at about 175° C. for another 3 hours, and at about 170° to 180° C. for the last 6 hours of the esterification reaction. During the esterification approximately 414 parts water and 61 parts of a water-immiscible liquid were separated.

The polymerizable, fusible, alloöcimene-modified propylene glycol fumarate resin prepared as above described had an acid number of 120. When cool, it was light yellow in color, hard, brittle and slightly tacky.

A copolymer of the above resin with a liquid monomer containing a $CH_2=C<$ grouping, specifically styrene, was prepared as follows:

|  | Parts |
|---|---|
| Finely divided alloöcimene-modified propylene glycol fumarate resin | 33.3 |
| Styrene | 16.7 |
| Inhibitor, specifically hydroquinone | 0.01 |
| Polymerization catalyst, specifically lauroyl peroxide | 0.25 |

The finely divided resin was dissolved in the styrene containing the inhibitor by shaking in a closed container for about 4 hours. The polymerization catalyst was added and shaking was continued for another hour. The resulting solution was light yellow in color. When a receptacle containing the solution was placed in a 100° C. oil bath, the solution gelled in a little less than 12 minutes at a temperature of 95° C. After heating in the bath for an additional 8 minutes, at which point the temperature was 148° C. due to the exothermic reaction that took place, a clear copolymer of the resin and the styrene was obtained. The maximum temperature reached during the copolymerization reaction was 150° C.

Example 2

|  | Parts | Approx. Mol Ratios |
|---|---|---|
| Propylene glycol | 323 | 2.125 |
| Fumaric acid | 464 | 2.0 |
| Alloöcimene | 272 | 1.0 |

Essentially the same procedure was followed as described under Example 1. The alloöcimene was added to the partial esterification product of 323 parts propylene glycol and 232 parts fumaric acid over a period of 30 minutes, during which addition the temperature of the reaction mass fell from 150° to 147° C. Heating was continued under reflux for an additional hour at about 146°–147° C. After standing for about 16 hours at room temperature, the remainder of the fumaric acid (232 parts) was added, and the reaction was continued in a manner similar to that described in the preceding example. Heating the mass at a temperature of about 158° to 192° C. over a period of about 20 hours, during which time about 96 parts water and 14 parts of a water-immiscible liquid were obtained, yielded a polymerizable resinous complex having an acid number of about 92. When cool, this resin was a glass-like material, medium yellow in color and very brittle.

The resin prepared as above described was compatible with styrene in all proportions. A mixture of 33.3 parts of this resin, 16.7 parts styrene and 0.25 part lauroyl peroxide gelled in 4½ minutes when a receptacle containing the same was placed in a 100° C. oil bath. The temperature at which the mixture gelled was 78° C. The maximum temperature of the exothermic reaction was 155° C., which was reached after the sample had been in the bath for a total of 13 minutes. After heating in the 100° C. bath for a total of 1 hour, a copolymer was obtained which, when cool, was hard, clear and had a Barcol hardness of 28.

Example 3

|  | Parts | Approx. Mol Ratios |
|---|---|---|
| Ethylene glycol | 248 | 2 |
| Fumaric acid | 464 | 2 |
| Alloöcimene | 272 | 1 |

Essentially the same procedure was followed as described under Example 1. The alloöcimene was added to the partial esterification product of 248 parts ethylene glycol and 232 parts fumaric acid over a period of 30 minutes, during which time the temperature fell from 150° to 137° C. Heating was continued under reflux for an additional 30 minutes at about 135° to 137° C. The reaction mass became clear in about 15 minutes after starting the addition of the alloöcimene. Some esterification took place while the reaction mass was brought up to 150° C. which required about 1½ hours, and there was a steady reflux of water and alloöcimene during the addition of the latter to the mass. The reaction mass was cooled to 100° C., and the remainder of the fumaric acid (232 parts) was then added slowly thereto since some foaming occurred. Heating the mass at a temperature of about 138° to 193° C. over a period of about 15 hours, during which time 116 parts of water and about 15 parts of a water-immiscible liquid were obtained, yielded a reactive resin having an acid number of 50. When cool, this resin was hard, very brittle and was compatible with styrene in all proportions.

A mixture of 33.3 parts of the above-described resin, 16.7 parts styrene and 0.25 part lauroyl peroxide gelled in a little over 4 minutes when a receptacle containing the same was placed in a 100° C. oil bath. The temperature of gelation was 55° to 60° C. The maximum temperature of the exothermic reaction was 150.5° C. After heating in the 100° C. bath for a total of 1 hour, a copolymer was obtained which, when cool, was hard, clear and had a Barcol hardness of 30.

A mixture of 40 parts of the alloöcimene-modified ethylene glycol fumarate resin in powdered form was mixed with 20 parts styrene, to which mixture was then added 0.3 part lauroyl peroxide and, after the catalyst had been dissolved in the mixture, 5 parts of ammonium bicarbonate. The resulting mixture was heated in a 100° C. oven for 1 hour. During curing the mass foamed to give a volume expansion of about 150%. The foamed copolymer was very hard, but was somewhat brittle.

A copolymer prepared from a mixture of 60 parts of the alloöcimene-modified resin, 40 parts styrene and 0.25 part lauroyl peroxide by heating the same for 1 hour at 100° C. was hard, clear and had a Barcol hardness of 30. A copolymer similarly prepared using equal parts of the resin and styrene had a Barcol hardness of 20 to 25, and also was hard and clear.

*Example 4*

|  | Parts | Approx. Mol Ratios |
|---|---|---|
| Ethylene glycol | 256 | 2.0625 |
| Fumaric acid | 464 | 2.0 |
| Alloöcimene | 272 | 1.0 |

Essentially the same procedure was followed as described under Example 1. The alloöcimene was added to the heated mass of 256 parts ethylene glycol and 232 parts fumaric acid over a period of 30 minutes, during which time the temperature dropped from 148° to 132° C. Heating was continued under reflux for an additional hour at about 132°–133° C. The reaction mass was cooled to 100° C., and the remainder of the fumaric acid (232 parts) was added thereto. Heating the mass at a temperature of about 146° to 196° C. over a period of about 14 hours, during which time 120 parts water and about 16 parts of a water-immiscible liquid were obtained, yielded a hard, reactive resin having an acid number of 49, and which was compatible with styrene in all proportions. Data on the viscosity of this resin when mixed with various proportions of styrene are shown below:

| Sample No. | Description of Sample | Letter Viscosity, Gardner-Holdt Bubble Viscosimeter | Viscosity in Poises |
|---|---|---|---|
| 1 | Mixture of 2 parts resin and 1 part styrene | W-X | 11 –13 |
| 2 | Mixture of 3 parts resin and 2 parts styrene | I-J | 2 – 2.5 |
| 3 | Mixture of 1 part resin and 1 part styrene | E-F | 1.2– 1.4 |

Copolymers were prepared from each of the above mixtures by incorporating into the individual sample 0.5% by weight thereof of lauroyl peroxide, and immersing the receptacles containing the resulting mixtures for 1 hour in an oil bath maintained at a temperature of about 100° C. The initial gel times and temperatures of the samples were as follows:

| Sample Number | Gel Time | Temperature, °C. |
|---|---|---|
| 1 | 4½ min | 69 |
| 2 | 4 min | 72 |
| 3 | 3 min., 50 sec | 72 |

The resulting copolymers were hard and clear. When tested for Barcol hardness, the following results were obtained:

| Sample Number | Barcol Hardness |
|---|---|
| 1 | 35 |
| 2 | 34 |
| 3 | 28–30 |

A mixture of 2 parts of the powdered alloöcimene-modified ethylene glycol fumarate resin of this example and 1 part styrene, which mixture also contained 0.02%, by weight of the total resin and styrene, of hydroquinone as an inhibitor of copolymerization, showed no signs of gelation after standing at room temperature for over 4 months. Gelation occurred after the mixture had stood from 5 to 6 months.

Twenty parts of the powdered alloöcimene-modified resin was added to 10 parts of isopropenyl toluene, and the mixture was stirred until a solution was obtained. The powdered resin dissolved slowly in the isopropenyl toluene, but the liquid remained clear at all times. This indicates an unlimited compatibility of the resin with the isopropenyl toluene. A copolymer of the isopropenyl toluene with the resin is prepared by adding a polymerization catalyst, e. g., benzoyl peroxide, lauryl peroxide, etc., to the mixed ingredients, and heating the resulting solution at about 80° to 140° C. until a solid copolymer is obtained.

A mixture of 30 parts of the powdered alloöcimene-modified resin, 20 parts of 2,5-dimethyl styrene and 0.25 part lauroyl peroxide was placed in a receptacle and heated in an oven for 2 hours at 100° C. The resulting copolymer was very clear and very hard, having a Barcol hardness of 40.

*Example 5*

Same formula as in the preceding example. The alloöcimene (peroxide-free alloöcimene) was added to the heated mass of 256 parts ethylene glycol and 232 parts of fumaric acid over a period of 30 minutes, during which time the temperature dropped from 150° to 135° C. Heating was continued under reflux for an additional hour at about 135° C. The reaction mass was cooled to about 120° C., and the remainder of the fumaric acid (232 parts) was added thereto. Heating the mass at a temperature of about 135° to 180° C. (3 hours at about 135° to 138° C., 2 hours at about 155° to 160° C. and 10 hours at about 180° C., or a total heating time of about 15 hours), during which time about 120 parts water and about 16 parts of a water-immiscible liquid were obtained, yielded a reactive resin having an acid number of 48. The resin was hard but brittle, and could be broken easily. It was compatible with styrene in all proportions.

*Preparation of copolymers*

The above resin was mixed in varying proportions with styrene. In all cases lauroyl peroxide in an amount corresponding to 0.5% by weight of the mixture was incorporated therein as a polymerization catalyst. The resin-styrene mixtures were mechanically stirred until clear, gel-free solutions were obtained. The liquid polymerizable compositions were cast in glass molds, the inner surfaces of which previously had been treated with a mixture of methylchlorosilanes to facilitate the separation of the hard copolymer from the glass. The styrene and resin were copolymerized, unless otherwise stated, by heating a receptacle containing the same in an oven for about 16 hours at about 50° C. and then for about 2 hours at about 100° C. Hard copolymers were obtained in all cases.

A. Thirty (30) parts of the resin was copolymerized with 20 parts styrene to yield a hard, fracture-free copolymer having a dielectric constant of 2.71 and a power factor of 0.015 when tested at 3000 megacycles, that is, at a radar frequency.

B. Twenty-five (25) parts of the resin was copolymerized with 25 parts styrene to yield a hard, fracture-free copolymer having a dielectric constant of 2.695 and a power factor of 0.014 when tested at 3000 megacycles.

C. Sixty (60) parts of the resin was copolymerized with 30 parts styrene to yield a hard, fracture-free copolymer having a smooth surface. The modulus in bending, at 25° C., of the resulting copolymer was $0.55 \times 10^6$. The modulus after further curing the copolymer by heating for 4 hours at 125° C. was the same as before, and $0.35 \times 10^6$ at 80° C. The same modulus values were obtained after heating for a second 4-hour period at 125° C. When tested for flexural strength after this last heating period, the copolymer showed a flexural strength of 9200 p. s. i. at 25° C. and 6700 p. s. i. at 80° C.

D. Seventy (70) parts of resin was copolymerized with 30 parts styrene to yield a hard, fracture-free copolymer having a smooth surface. The same values for modulus in bending were obtained as in the case of the "C" copolymer described above. However, when tested for flexural strength after the final 4-hour heating period at 125° C., this copolymer gave a value of 10,400 p. s. i. at 25° C. and 8400 p. s. i. at 80° C.

E. Thirty-five (35) parts of the resin was copolymerized with 15 parts styrene to yield a hard, fracture-free copolymer having a dielectric constant at 3000 megacycles of 2.84 and a power factor at the same frequency of 0.018.

F. Thirty (30) parts of the resin was copolymerized with 15 parts styrene to yield a hard, fracture-free copolymer having a dielectric constant at 3000 megacycles of 2.79 and the same power factor as the copolymer of "E."

G. Thirty (30) parts of the resin was copolymerized with 20 parts of dimethyl styrene using, in this case, a curing time of about 20 hours at 50° C. and about 2 hours at 100° C. A hard, fracture-free copolymer having a good surface finish was obtained. Its dielectric constant at 3000 megacycles was 2.69 and its power factor at the same frequency was 0.016.

H. Ninety (90) parts of the resin was copolymerized with 60 parts styrene by first placing a receptacle containing the mixture in a 100° C. oven for a few minutes until gelation had occurred, removing the receptacle from the oven and allowing the copolymerization to proceed at normal temperature for 1 hour, and then heating for 2 hours at 100° C. The resulting copolymer was hard, fracture-free and had a Barcol hardness of 30.

I. A hard, fracture-free copolymer was obtained by heating a mixture of 60 parts of the above resin, 40 parts styrene and 0.5 part lauroyl peroxide for 16 hours at 50° C. and 2 hours at 100° C. The results of determinations of the dielectric constant and power factor of this copolymer at various frequencies are shown below:

| Frequency | Dielectric Constant | Power Factor |
|---|---|---|
| 60 | 3.11 | 0.005 |
| $10^3$ | 3.09 | 0.0102 |
| $10^6$ | 3.09 | 0.012 |
| $1.2 \times 10^7$ | 3.00 | 0.0135 |
| $5 \times 10^7$ | 2.96 | 0.0142 |
| $3 \times 10^9$ | 2.78 | 0.017 |

*Example 6*

| | Parts | Approx. Mol Ratios |
|---|---|---|
| Ethylene glycol | 186.0 | 6 |
| Fumaric acid | 348.0 | 6 |
| Alloöcimene (peroxide free, 95% pure material) | 71.5 | 1 |

Essentially the same procedure was followed as described under Example 1 with the exception that additional polyhydric alcohol as well as fumaric acid were added to the solution of the adduct. Sixty-two (62) parts of ethylene glycol and 58 parts of fumaric acid, that is, in the ratio of 2 mols of the former to 1 mol of the latter, were heated together under reflux to a temperature of about 150° C., at which point the above-stated amount of alloöcimene was added dropwise over a period of 10 minutes. Heating was continued for 15 minutes to complete the formation of the adduct, yielding a clear solution. The remainder of the ethylene glycol was now added, thereby cooling the contents to about 100° C., after which the remainder of the fumaric acid was added. The condenser was arranged for downward distillation. Heating the reaction mass at about 160° C. (bath temperature) for about 5 hours and at about 180° C. (bath temperature) for about 10 hours, during which time about 92 parts of water and about 4 parts of a water-immiscible liquid were obtained, yielded a reactive resin having an acid number of about 49. When cool, this resin was a clear, semi-hard, sticky mass.

The above resin was not permanently compatible with styrene in all proportions. When styrene was added to the hot resin, the hot styrene-resin solution was clear. On cooling, the resin crystallized out of the solution. When the resin and styrene were admixed in the ratios of 60 parts of the former and 30 or 40 parts of the latter, the mass became a waxy, white, opaque material. In 50/50 proportions of resin and styrene, a layer of styrene formed above this waxy material.

Sixty-seven (67) parts of the above resin was mixed with 33 parts of styrene and 0.5 part of lauroyl peroxide. A hard, fracture-free copolymer, which was somewhat hazy, was obtained by heating a casting of this mixture for 40 hours at 60° C. and 2 hours at 100° C. The bending modulus of the resulting copolymer was $0.55 \times 10^6$ at 25° C. and $0.25 \times 10^6$ at 80° C. The modulus after further curing the copolymer by heating for 4 hours at 125° C. was $0.60 \times 10^6$ at 25° C. and $0.40 \times 10^6$ at 80° C., the same values being obtained after a second 4-hour heating period at 125° C. When tested for flexural strength and Barcol hardness after this last heating period, the copolymer showed a flexural strength of 13,700 p. s. i. at 25° C. and 9200 p. s. i. at 80° C., and had a Barcol hardness of 45.

A copolymer very similar in appearance and properties to the one described in the preceding paragraph was obtained by copolymerizing 60 parts of the resin with 40 parts styrene. After the second 4-hour heating period at 125° C. this copolymer showed a flexural strength of 10,000 p. s. i. at 25° C. and 8400 p. s. i. at 80° C. and had a Barcol hardness of 44.

*Example 7*

|  | Parts | Approx. Mol Ratios |
|---|---|---|
| Ethylene glycol | 206 | 5 |
| Fumaric acid | 387 | 5 |
| Alloöcimene (peroxide-free, 95% pure material) | 95 | 1 |

Essentially the same procedure was followed as described under Example 6. Eighty-three (83) parts of ethylene glycol and 77 parts of fumaric acid, that is, in the ratio of 2 mols of the former to 1 mol of the latter, were heated together under reflux to a temperature of about 150° C., at which point the above-stated amount of alloöcimene was added dropwise over a period of 20 minutes. The remainder of the ethylene glycol and of the fumaric acid were now added, and the condenser was arranged for downward distillation. Heating the reaction mass at about 160° C. (bath temperature) for about 8 hours and at about 180° C. (bath temperature) for about 14 hours, during which time about 101 parts of water and about 7 parts of a water-immiscible liquid were obtained, yielded a reactive resin having an acid number of about 50. This resin was clear and very viscous while hot. On cooling, it was a slightly sticky, glass-like material. Warm solutions of the resin in styrene were clear, but become opaque upon cooling due to the crystallization of the resin.

The above resin was mixed with varying proportions of styrene. In all cases lauroyl peroxide in an amount corresponding to 0.5% by weight of the mixture was incorporated therein as a polymerization catalyst. The styrene and resin were copolymerized by heating a receptacle containing the same in an oven for 18 hours at about 50° C. and then for 2 hours at about 100° C.

A. Sixty-seven (67) parts of the resin was copolymerized with 33 parts of styrene to yield a hard, fracture-free copolymer having a smooth surface. The bending modulus of the resulting copolymer was $0.55 \times 10^6$ at 25° C. and $0.30 \times 10^6$ at 80° C. The modulus after further curing the copolymer by heating for 4 hours at 125° C. was $0.55 \times 10^6$ at 25° C. and $0.35 \times 10^6$ at 80° C., and after a second 4-hour curing period at 125° C. was $0.60 \times 10^6$ at 25° C. and $0.35 \times 10^6$ at 80° C. When tested for flexural strength and Barcol hardness after this last heating period, the copolymer showed a flexural strength of 14,100 p. s. i. at 25° C. and 9400 p. s. i. at 80° C., and had a Barcol hardness of 55.

B. Ninety (90) parts of the above resin was copolymerized with 60 parts of styrene to yield a hard, fracture-free copolymer having a smooth surface. The bending modulus of the resulting copolymer was the same as the copolymer of "A" when tested at 25° C. as initially cured and after the first 4-hour heating period at 125° C. Like the copolymer of "A" its modulus at 80° C. was $0.30 \times 10^6$ when tested after the initial cure period, but was $0.40 \times 10^6$ at 80° C. when tested after the first 4-hour heating period. After heating for a second period of 4 hours at 125° C., its modulus of bending was $0.55 \times 10^6$ at 25° C. and $0.40 \times 10^6$ at 80° C., its flexural strength was 12,400 p. s. i. at 25° C. and 8500 p. s. i. at 80° C., and its Barcol hardness was 51.

C. A hard, fracture-free copolymer obtained by copolymerizing 25 parts of the resin with 25 parts styrene, had a dielectric constant of 2.76 and a power factor of 0.014 when tested at 3000 megacycles.

*Example 8*

|  | Parts | Approx. Mol Ratios |
|---|---|---|
| Ethylene glycol | 248 | 4 |
| Fumaric acid | 464 | 4 |
| Alloöcimene (peroxide-free, 95% pure material) | 143 | 1 |

Essentially the same procedure was followed as described under Example 6. One hundred and twenty-four (124) parts of ethylene glycol and 116 parts of fumaric acid, that is, in the ratio of 2 mols of the former to 1 mol of the latter, were heated together under reflux to a temperature of about 150° C. at which point the above-stated amount of alloöcimene was added dropwise over a period of 30 minutes. Heating was continued for 30 minutes to complete the formation of the adduct, yielding a clear solution. The remainder of the ethylene glycol was now added, thereby cooling the contents of the reaction vessel to about 100° C., after which the remainder of the fumaric acid was added. The condenser was arranged for downward distillation. Heating the reaction mass at about 160° C. (bath temperature) for about 6 hours and at about 180° C. (bath temperature) for about 14 hours, during which time about 122 parts water and about 6 parts of a water-immiscible liquid were obtained, yielded a reactive resin having an acid number of about 49. This resin, when cool, was a clear, sticky material.

The above resin was mixed with varying proportions of styrene. In all cases lauroyl peroxide in an amount corresponding to 0.5% by weight of the mixture was incorporated therein as a polymerization catalyst. The styrene and resin were copolymerized by heating a receptacle containing the same in an oven for about 16 hours at about 50° C. and then for 2 hours at about 100° C.

A. Sixty-seven (67) parts of the resin was copolymerized with 33 parts of styrene to yield a hard, fracture-free copolymer. The bending modulus of the resulting copolymer was $0.60 \times 10^6$ at 25° C. and $0.25 \times 10^6$ at 80° C. The modulus, after further curing the copolymer by heating for 4 hours at 125° C. and again after heating for a second period of 4 hours at 125° C., in both cases was $0.60 \times 10^6$ at 25° C. and $0.35 \times 10^6$ at 80° C. When tested for flexural strength and Barcol hardness after this last heating period, the copolymer showed a flexural strength of 11,100 p. s. i. at 25° C. and 7,800 p. s. i. at 80° C. and had a Barcol hardness of 51.

B. Sixty (60) parts of the resin was copolymerized with 40 parts styrene to yield a hard, fracture-free copolymer. The bending modulus of this copolymer was $0.60 \times 10^6$ at 25° C. and $0.30 \times 10^6$ at 80° C. After further curing the copolymer by heating for 4 hours at 125° C. and for a second period of the same duration at the same temperature, the modulus in each case was $0.55 \times 10^6$ at 25° C. and $0.40 \times 10^6$ at 80° C. The flexural strength of the copolymer after the second period of heating was 11,700 p. s. i. at 25° C. and 8,700 p. s. i. at 80° C. The Barcol hardness of the copolymer after the last heating period was 51.

C. Fifty (50) parts of the resin was copolymerized with 50 parts styrene to yield a hard, fracture-free copolymer having a bending modulus which was the same as the copolymer of "B" with the exception that the bending modulus of the initially cured copolymer was $0.55 \times 10^6$ at 25° C. The flexural strength and Barcol hardness of the copolymer after the second period of heating for 4 hours at 125° C. was 13,300 p. s. i. at 25° C. and 9,500 p. s. i. at 80° C. and the Barcol hardness was 53.

D. A hard, fracture-free copolymer of 33 parts of the resin and 17 parts of styrene had a dielectric constant of 2.87 and a power factor of 0.014 when tested at 3000 megacycles.

E. A similar copolymer of 30 parts of the resin and 20 parts of styrene had a dielectric constant of 2.78 and a power factor of 0.019 when tested at 3000 megacycles.

*Example 9*

|  | Parts | Approx. Mol Ratio |
| --- | --- | --- |
| Ethylene glycol | 186 | 3 |
| Fumaric acid | 348 | 3 |
| Alloöcimene (peroxide-free, 95% pure material) | 143 | 1 |

Essentially the same procedure was followed as described under Example 6. One hundred and twenty-four parts of ethylene glycol and 116 parts of fumaric acid, that is, in the ratio of 2 mols of the former to 1 mol of the latter, were heated together under reflux to a temperature of about 150° C., at which point the above-stated amount of alloöcimene was added dropwise over a period of ½ hour. Heating was continued for 30 minutes to complete the formation of adduct, yielding a clear solution. The remainder of the ethylene glycol was now added and the reaction mass was allowed to cool to about 100° C. The remainder of the fumaric acid was next added, after which the condenser was arranged for downward distillation. Heating the reaction mass at a temperature of 160° C. (bath temperature) for about 10 hours and at 180° C. (bath temperature) for about 18 hours, during which period 86 parts of water and about 6 parts of a water-immiscible liquid were obtained, yielded a reactive resin having an acid number of about 51. When cool, this resin was a clear, hard, slightly tacky, glass-like material. The resin was not compatible with styrene in all proportions but a solution of 50 parts of the resin to 100 parts of styrene was clear.

The above resin was copolymerized with styrene as described under Example 8 with the exception that the curing time was 18 hours at 50° C. and 2 hours at 100° C.

A. Sixty-seven (67) parts of the resin was copolymerized with 33 parts styrene to yield a hard, clear, fracture-free casting. The bending modulus of the resulting copolymer was $0.55 \times 10^6$ at 25° C. and $0.25 \times 10^6$ at 80° C. The modulus, after further curing the copolymer by heating for 4 hours at 125° C. and again after heating for a second period of 4 hours at 125° C., in both cases was $0.55 \times 10^6$ at 25° C. and $0.45 \times 10^6$ at 80° C. When tested for flexural strength and Barcol hardness after this last heating period, the copolymer showed a flexural strength of 13,100 p. s. i. at 25° C. and 8500 p. s. i. at 80° C., and had a Barcol hardness of 53.

B. Sixty (60) parts of the resin was copolymerized with 40 parts of styrene, yielding a hard, clear, fracture-free copolymer. The bending modulus of the resulting copolymer was the same as the copolymer of "A" with the exception that after two heating periods of 4 hours each at 125° C. the bending modulus was $0.35 \times 10^6$. The flexural strength after the last heating period was 11,200 p. s. i. at 25° C. and 9100 p. s. i. at 80° C., and the Barcol hardness was 52.

C. Fifty (50) parts of the resin was copolymerized with 50 parts styrene, yielding a hard, clear, fracture-free copolymer. The bending modulus of the resulting copolymer was $0.50 \times 10^6$ at 25° C. and $0.40 \times 10^6$ at 80° C. The modulus after further curing the copolymer by heating twice for 4 hours each time at 125° C. was, after each heating period, $0.55 \times 10^6$ at 25° C. and $0.40 \times 10^6$ at 80° C. The flexural strength after the last heating period was 13,300 p. s. i. at 25° C. and 10,000 p. s. i. at 80° C., and the Barcol hardness was 51.

D. A hard, clear, fracture-free copolymer of 33 parts of the resin and 17 parts styrene had a dielectric constant of 2.82 and a power factor of 0.017 when tested at 3000 megacycles.

E. A similar copolymer of 30 parts of the resin and 20 parts styrene had a dielectric constant of 2.79 and a power factor of 0.015 when tested at 3000 megacycles.

*Example 10*

Propylene glycol (152 parts) and fumaric acid (232 parts), that is, in equimolar ratios, were placed in a 3-necked reaction vessel equipped with a mechanical stirrer, reflux condenser, dropping funnel and a $CO_2$ delivery tube. With the reaction vessel immersed in an oil bath maintained at about 160° C. and an inert gas, specifically carbon dioxide, over the contents, 272 parts alloöcimene (that is, in the same molar ratio as the propylene glycol and fumaric acid) was added dropwise over a period of 1¾ hours. The resulting reaction product (adduct of the alloöcimene with a partial ester of propylene glycol and fumaric acid, some unreacted propylene glycol also being present) was a clear, straw-colored solution.

To one-half (328 parts) of the product obtained as above described were added 76 parts propylene glycol and 116 parts fumaric acid. The condenser was rearranged for distillation, and the esterification reaction was run under a $CO_2$ atmosphere while heating the reaction mass at a temperature of the order of 190° to 200° C. for about 12 hours. The resulting thermoplastic resin was clear, very stiff, and had an acid number of 61. It became hard and brittle on cooling.

One hundred and twenty (120) parts of the above resin, which had been powdered by ball milling, was dissolved in 60 parts styrene, and 0.9 part of a polymerization catalyst, specifically lauroyl peroxide, was added thereto. The resulting clear solution had a Gardner-Holdt viscosity of X-Y.

When two plies of glass cloth were impregnated with the resin solution and cured for 1 hour at 100° C. under contact pressure, a very stiff laminate having a good surface hardness was obtained.

A clear, hard, fracture-free casting having a very good surface appearance was obtained by curing a portion of the above styrene-resin solution for about 16 hours at 60° C. and 2 hours at 100° C.

A polymerizable composition comprising 25 parts of the polymerizable alkyd resin of this example, 25 parts of diallyl phthalate and 0.5 part benzoyl peroxide was applied to a glass plate, and the coated plate was baked for 1 hour at 100° C. The resulting film of copolymer was tacky while hot but non-tacky upon cooling to room temperature.

It will be understood, of course, by those skilled in the art that our invention is not limited to the specific reactants nor to the particular proportions thereof given in the above illustrative examples. Thus, instead of ethylene glycol or propylene glycol any other polyhydric alcohol may be used in preparing the adduct or in the subsequent esterification reaction of the polyhydric alcohol with a polycarboxylic acid including fumaric acid while admixed with said adduct. Illustrative examples of such alcohols are diethylene glycol, triethylene glycol, tetraethylene glycol, pentaethylene glycol, hexaethylene glycol, decamethylene glycol, octadecandiol, 2,2-dimethyl propandiol, butylene glycol, glycerol, pentaerythritol, dipentaerythritol, mannitol, etc.

The polycarboxylic acid employed in the esterification reaction in all cases includes fumaric acid as an essential component, but also may include other saturated or unsaturated polycarboxylic acids, including alpha, beta-unsaturated polycarboxylic acids other than fumaric acid, or anhydrides thereof (if available), for example, phthalic, chlorophthalic (including tetrachlorophthalic), terephthalic, malonic, succinic, glutaric, adipic, pimelic, sebacic, azelaic, suberic, gluconic, citric, tricarballylic, maleic, itaconic, citraconic, mesaconic, aconitic, etc.

In some cases it may be advisable to incorporate a monohydric alcohol (e. g., when a trihydric or higher polyhydric alcohol is one of the reactants) or a monocarboxylic acid or both a monohydric alcohol and a monocarboxylic acid into the reaction mass along with the other resin-forming reactants. Illustrative examples of monohydric alcohols that may be employed are n-butanol, the amyl alcohols, cyclohexanol, n-hexanol, 2-methyl hexanol, n-octanol, decanol, dodecanol, tetradecanol, octadecanol, cetyl alcohol, reduced geraniol, reduced fatty oils such as coconut oil, palm oil, etc., benzyl alcohol, phenylethyl alcohol, terpineol, fenchyl alcohol, allyl alcohol, methallyl alcohol, oleyl alcohol, linoleyl alcohol, the monomethyl, monoethyl, monobutyl, monophenyl, monobenzyl ethers of ethylene glycol and of diethylene glycol, etc. Illustrative examples of monocarboxylic acids that may be used further to modify the reactive resin are acetic, propionic, butyric, isobutyric, valeric, caproic, acrylic, methacrylic, ethacrylic, crotonic, cinnamic, the drying oil fatty acids, e. g., linseed oil fatty acids, etc. Mixtures of monohydric alcohols and monocarboxylic acids, e. g., mixtures of such as those above mentioned by way of illustration, may be employed if desired. Illustrative examples of other polycarboxylic acids that may be used with the fumaric acid and of other monohydric alcohol and monocarboxylic acid modifying reactants, as well as other modifiers, that may be employed in practicing our invention are given in the aforementioned Kropa copending applications with particular reference to the alkyd resins used in practicing the inventions covered by each of those applications.

If a modifying acid is used as a reactant, the amount thereof should not be so great that the fumaric acid is present in the esterifiable mass in an amount corresponding to less than 1 mol thereof for each 2 mols of total acid modifier including the fumaric acid-acyclic terpene adduct. The molar amount of polyhydric alcohol or of both polyhydric alcohol and modifying monohydric alcohol should be approximately the same (or with a slight molar excess of alcohol, e. g., from 1 to 10% molar excess) as the total molar amount of polycarboxylic acid and modifying monocarboxylic acid (if any) employed, due consideration being given to the number of esterifiable hydroxyl and carboxylic groups in each of the alcohol and carboxylic acid reactants, as is readily understood by those skilled in the art.

Polymerization catalysts other than the lauroyl peroxide used in compositions of the above illustrative examples also may be employed, for instance catalysts such as hereinbefore mentioned by way of illustration as well as others.

The polymerizable compositions of this invention are especially adapted for use in electrically insulating applications, especially in such fields wherein insulating materials of low power factor are important as in high frequency insulation, but they also have a wide variety of other applications. For instance, with or without a filler, they may be used in the production of molding compositions and molded articles; as the binder in the production of laminated articles; as coating compositions for use in finishes for wood, metals, plastics, etc., or in the treatment of fibrous materials, e. g., paper, cloth, leather, etc.; as impregnants for fibrous materials of all kinds, etc. They are also particularly suitable for use in the manufacture of laminated articles. A fibrous material, e. g., paper or sheets of cloth, asbestos, etc., is impregnated with the polymerizable material in liquid state. The dried, impregnated sheets are superimposed and bonded together under heat, e. g., at 40° to 200° C., and under pressure, for instance at pressures ranging from contact pressure up to 4000 to 5000 pounds per square inch depending upon the particular composition employed. For many purposes where high strength materials are required, glass cloth is especially suitable for the production of laminates, but other fibrous materials may be employed in addition to those aforementioned, e. g., those composed of or containing cellulose esters (e. g., cellulose acetate), regenerated cellulose fibers, rayons, synthetic fibers, for instance nylon, polyacrylonitrile fibers, vinylidene chloride polymeric compositions such as those sold under the trade name of "Saran," etc. They also may be used as impregnants of electrical coils, as spools or cores upon which such coils are formed, as a capacitor dielectric material alone or in combination with paper, glass fibers in woven or felted form, or other capacitor dielectric materials, as electrical cable insulation, etc.

These new reactive compositions or mixtures are particularly useful in the production of molded articles. The polymerizable compositions may be employed alone or admixed with a filler, dye, pigment, opacifier, lubricant, etc. Among the fillers that may be employed are alpha-cellulose pulp, asbestos fibers, cotton flock, chopped cloth cuttings, glass fibers, wood flour, mica dust, powdered quartz, finely divided titanium dioxide, sand, clay, diatomaceous earth, etc.

The polymerizable compositions of this invention also may be employed as castings. They also may be used as adhesives, for instance in the production of optical elements containing a plurality of elements, examples of which are compound lenses, compound prisms, Nicol prisms, etc. They also may be employed in making plane, convex and concave optical gratings and sound records as more fully described in the copending application of one of us (Edward L. Kropa), Serial No. 702,599, filed Oct. 11, 1946.

Other uses to which the compositions of the present invention are applicable are the same as those given in the aforementioned copending applications of Kropa with reference to the compositions of those applications.

Natural or other synthetic resins and other modifiers may be incorporated into the compositions of this invention in order to modify the latter and to obtain products which may be especially suitable for a particular service application. Examples of such modifying agents are shellac, ester gums, cellulose esters and ethers, urea - aldehyde resins, aminotriazine - aldehyde resins (e. g., melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, conventional alkyd resins of the non-polymerizable type, etc. The polymerization products of this invention also may be modified by incorporating therewith rubber or synthetic rubber-like materials.

What we claim as new and desire to secure by Letters Patent of the United States is:

1. The method which comprises effecting an esterification reaction between ingredients comprising (1) a polyhydric alcohol, (2) a polycarboxylic acid including fumaric acid and (3) an adduct formed by reaction of alloöcimene with ingredients comprising a member of the class consisting of (a) fumaric acid, (b) partial esters of fumaric acid and a polyhydric alcohol and (c) mixtures of (a) and (b), said adduct being formed while the adduct-forming reactants are admixed with a polyhydric alcohol, and reacting the reactive, modified unsaturated alkyd resin thereby obtained with an aromatic hydrocarbon which contains a $CH_2=C<$ grouping attached directly to a benzene nucleus, the aforementioned polyhydric alcohol in all cases being one which is free from unsaturation between carbon atoms thereof and in which the only reactive groups are hydroxyl groups.

2. The method which comprises forming an adduct of alloöcimene with ingredients comprising a member of the class consisting of (1) fumaric acid, (2) partial esters of fumaric acid and a polyhydric alcohol and (3) mixtures of (a) and (b), said adduct being formed while the adduct-forming reactants are admixed with a polyhydric alcohol, esterifying the polyhydric alcohol with a polycarboxylic acid including fumaric acid while admixed with the said adduct to yield a polymerizable, modified unsaturated alkyd resin, and reacting the said alkyd resin with an aromatic hydrocarbon which contains a $CH_2=C<$ grouping attached directly to a benzene nucleus, the aforementioned polyhydric alcohol in all cases being one which is free from unsaturation between carbon atoms thereof and in which the only reactive groups are hydroxyl groups.

3. The method which comprises effecting an esterification reaction between ingredients comprising (1) a polyhydric alcohol, (2) fumaric acid and (3) an adduct formed by reaction of alloöcimene with a member of the class consisting of (a) fumaric acid, (b) partial esters of fumaric acid and a polyhydric alcohol and (c) mixtures of (a) and (b), said adduct being formed while the adduct-forming reactants are admixed with a polyhydric alcohol, and reacting the polymerizable, modified unsaturated alkyd resin thereby obtained with styrene, the aforementioned polyhydric alcohol in all cases being one which is free from unsaturation between carbon atoms thereof and in which the only reactive groups are hydroxyl groups.

4. The method which comprises heating together to form a complex ester (1) a dihydric alcohol, (2) a dicarboxylic acid including fumaric acid and (3) an adduct formed by reaction of ingredients comprising approximately equal molar amounts of alloöcimene and fumaric acid while admixed with a dihydric alcohol in the ratio of at least 2 but not more than 6 mols thereof for each mol of fumaric acid used in the formation of said adduct, and heating the resulting polymerizable ester in the presence of a polymerization catalyst with an aromatic hydrocarbon which contains a $CH_2=C<$ grouping attached directly to a benzene nucleus until a substantially infusible copolymer has been obtained, the aforementioned dihydric alcohol in all cases being one which is free from unsaturation between carbon atoms thereof and in which the only reactive groups are hydroxyl groups.

5. The method which comprises heating together to form a complex ester (1) a dihydric alcohol, (2) a dicarboxylic acid including fumaric acid and (3) an adduct formed by reaction, in the presence of a dihydric alcohol, of alloöcimene with ingredients comprising a partial ester of fumaric acid and a dihydric alcohol, the molar amount of alloöcimene being approximately equal to the molar amount of fumaric acid used in the preparation of said partial ester, and the total molar amount of dihydric alcohol employed being at least twice but not more than six times the total molar amount of fumaric acid used, and heating the resulting polymerizable ester in the presence of a polymerization catalyst with an aromatic hydrocarbon which contains a CH$_2$=C< grouping attached directly to a benzene nucleus until a substantially infusible copolymer has been obtained, the aforementioned dihydric alcohol in all cases being one which is free from unsaturation between carbon atoms thereof and in which the only reactive groups are hydroxyl groups.

6. The method which comprises heating together to form a complex ester ingredients comprising (1) a polyhydric alcohol, (2) fumaric acid and (3) an adduct formed by reaction, in the presence of a polyhydric alcohol, of alloöcimene with ingredients comprising a member of the class consisting of (a) fumaric acid, (b) partial esters of fumaric acid and a polyhydric alcohol and (c) mixtures of (a) and (b), the molar amount of alloöcimene being approximately equal to the molar amount of fumaric acid used in forming said adduct, the total polyhydric alcohol and fumaric acid reactants being in approximately equimolecular proportions and the molar proportions of each ranging from 2 to 6 mols thereof for each mol of alloöcimene used in forming said adduct, and heating the resulting polymerizable ester in the presence of a polymerization catalyst with an aromatic hydrocarbon which contains a CH$_2$=C< grouping attached directly to a benzene nucleus until a substantially infusible copolymer has been obtained, the aforementioned polyhydric alcohol in all cases being one which is free from unsaturation between carbon atoms thereof and in which the only reactive groups are hydroxyl groups.

7. The method which comprises heating together (1) alloöcimene and (2) a reaction mass including a glycol and fumaric acid in the ratio of at least 2 but not more than 6 mols of the former to 1 mol of the latter until a solution containing an adduct of alloöcimene and fumaric acid has been obtained, the alloöcimene being employed in a molar amount approximately equal to the molar amount of fumaric acid in the said reaction mass, esterifying the said glycol of (2) with fumaric acid in the presence of said adduct, the total glycol and fumaric acid reactants being in approximately equimolecular proportions, and the molar proportions of each ranging from 2 to 6 mols thereof for each mol of alloöcimene employed, and heating the resulting polymerizable, modified unsaturated alkyd resin with styrene while admixed with a polymerization catalyst to yield a solid copolymer, the aforementioned glycol in all cases being one which is free from unsaturation between carbon atoms thereof and in which the only reactive groups are hydroxyl groups, and the said unsaturated alkyd resin constituting from 20 to 80 per cent by weight of the total amount of said resin and styrene.

8. The method which comprises heating together (1) alloöcimene and (2) a reaction mass including a glycol and fumaric acid in the ratio of at least 2 but not more than 6 mols of the former to 1 mol of the latter until a solution containing an adduct of alloöcimene and fumaric acid has been obtained, the alloöcimene being employed in a molar amount approximately equal to the molar amount of fumaric acid in the said reaction mass, esterfying the said glycol of (2) with fumaric acid in the presence of said adduct, the total glycol and fumaric acid reactants being in approximately equimolecular porportions, and the molar proportions of each ranging from 2 to 3 mols thereof for each mol of alloöcimene employed, and heating the resulting modified unsaturated alkyd resin with styrene while admixed with a polymerization catalyst until a substantially infusible copolymer has been obtained, the aforementioned glycol in all cases being one which is free from unsaturation between carbon atoms thereof and in which the only reactive groups are hydroxyl groups, and the said unsaturated alkyd resin constituting from 30 to 70 per cent by weight of the total amount of said resin and said styrene.

9. A polymerizable composition comprising (1) a polymerizable, modified unsaturated alkyd resin obtained by an esterification reaction of ingredients comprising (a) a polyhydric alcohol, (b) a polycarboxylic acid including fumaric acid and (c) an adduct formed by reaction of alloöcimene with ingredients comprising a member of the class consisting of (A) fumaric acid, (B) partial esters of fumaric acid and a polyhydric alcohol and (C) mixtures of (A) and (B), said adduct being formed while the adduct-forming reactants are admixed with a polyhydric alcohol, and (2) an aromatic hydrocarbon which contains a CH$_2$=C< grouping attached directly to a benzene nucleus, the aforementioned polyhydric alcohol in all cases being one which is free from unsaturation between carbon atoms thereof and in which the only reactive groups are hydroxyl groups, and the said unsaturated alkyd resin of (1) constituting from 20 to 80 per cent by weight of the total amount of the ingredients of (1) and (2).

10. A polymerizable composition comprising (1) styrene and (2) a polymerizable, modified unsaturated alkyd resin obtained by an esterification reaction of (a) a glycol, (b) fumaric acid and (c) an adduct formed by reaction of alloöcimene and fumaric acid while admixed with a glycol, the aforementioned glycol in all cases being one which is free from unsaturation between carbon atoms thereof and in which the only reactive groups are hydroxyl groups, and the said unsaturated alkyd resin of (2) constituting from 30 to 70 per cent by weight of the total amount of said resin and said styrene of (1).

11. A composition comprising the product of polymerization of a polymerizable mixture including (1) a polymerizable, modified unsaturated alkyd resin obtained by an esterification reaction of ingredients comprising (a) a polyhydric alcohol, (b) a polycarboxylic acid including fumaric acid and (c) an adduct formed by reaction of alloöcimene with ingredients comprising a member of the class consisting of (A) fumaric acid, (B) partial esters of fumaric acid and a polyhydric alcohol and (C) mixtures of (A) and (B), said adduct being formed while the adduct-forming reactants are admixed with a polyhydric alcohol, and (2) an aromatic hydrocarbon which contains a CH$_2$=C< grouping attached directly to a benzene nucleus, the aforementioned polyhydric alcohol in all cases being one which is free from unsaturation between carbon atoms thereof and in which the only reactive groups are hydroxyl groups.

12. A composition comprising the product of polymerization of a polymerizable mixture including (1) a polymerizable, modified unsaturated alkyd resin obtained by an esterification reaction of ingredients comprising (a) a polyhydric alcohol, (b) fumaric acid and (c) an adduct formed by reaction of alloöcimene with a member of the class consisting of (A) fumaric acid, (B) partial esters of fumaric acid and a polyhydric alcohol and (C) mixtures of (A) and (B), said adduct being formed while the adduct-forming reactants are admixed with a polyhydric alcohol, and (2) styrene, the aforementioned polyhydric alcohol in all cases being one which is free from unsaturation between carbon atoms thereof and in which the only reactive groups are hydroxyl groups.

13. A composition comprising the product of polymerization of a mixture of copolymerizable ingredients including (1) a complex ester obtained by an esterification reaction of (a) a dihydric alcohol, (b) a dicarboxylic acid including fumaric acid and (c) an adduct formed by reaction of ingredients comprising approximately equal molar amounts of alloöcimene and fumaric acid while admixed with a dihydric alcohol in the ratio of at least two but not more than six mols thereof for each mol of fumaric acid used in the formation of said adduct and (2) an aromatic hydrocarbon which contains a $CH_2=C<$ grouping attached directly to a benzene nucleus, the aforementioned dihydric alcohol in all cases being one which is free from unsaturation between carbon atoms thereof and in which the only reactive groups are hydroxyl groups.

14. A composition comprising the substantially infusible product of polymerization of a polymerizable mixture including (1) styrene and (2) a modified unsaturated alkyd resin obtained by an esterification reaction of ingredients comprising (a) a glycol, (b) fumaric acid and (c) an adduct formed by reaction of ingredients comprising alloöcimene and fumaric acid while admixed with a glycol, the aforementioned glycol in all cases being one which is free from unsaturation between carbon atoms thereof and in which the only reactive groups are hydroxyl groups, and the said unsaturated alkyd resin of (2) constituting from 30 to 70 per cent by weight of the total amount of said resin and said styrene of (1).

15. A composition as in claim 10 wherein the glycol is ethylene glycol.

16. A composition as in claim 10 wherein the glycol is propylene glycol.

17. The method which comprises heating together to form an adduct ingredients comprising (1) alloöcimene and (2) a partial esterification product of propylene glycol and fumaric acid in the ratio of about 2 mols of the former to 1 mol of the latter, the alloöcimene being employed in a molar amount approximately equal to the aforementioned molar amount of fumaric acid, adding to the resulting reaction mass fumaric acid in a molar amount approximately equal to the molar amount of said acid used in the formation of said esterification product of (2), esterifying the excess propylene glycol with the said added fumaric acid in the presence of the adduct formed by reaction of the ingredients of (1) and (2), the propylene glycol and total fumaric acid reactants being employed in molar proportions of approximately 2 mols of each for each mol of alloöcimene employed, continuing the said esterifying operation until there has been obtained a polymerizable, fusible, alloöcimene - modified propylene glycol fumarate resin which is hard when cool, and heating the said fusible resin with styrene while admixed with a small amount of a polymerization catalyst thereby to obtain a substantially infusible copolymer having good electrical characteristics, the said fusible resin and styrene being employed in weight proportions of about 2 parts of the former to 1 part of the latter.

EDWARD L. KROPA.
ARTHUR S. NYQUIST.

REFERENCES CITED

The following references are of record in the file of this patent:

UNITED STATES PATENTS

| Number | Name | Date |
|---|---|---|
| 2,253,681 | Bradley | Aug. 26, 1941 |
| 2,348,575 | Rummelsburg | May 9, 1944 |
| 2,369,689 | Robie et al. | Feb. 20, 1945 |
| 2,409,633 | Kropa | Oct. 22, 1946 |

OTHER REFERENCES

Doscher et al.: pages 315–319, Ind. and Eng. Chem., March 1941.